(12) United States Patent  
Kim

(10) Patent No.: US 7,427,453 B2
(45) Date of Patent: Sep. 23, 2008

(54) POUCHED LITHIUM SECONDARY BATTERY

(75) Inventor: You-Mee Kim, Cheonan-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 796 days.

(21) Appl. No.: 10/863,510

(22) Filed: Jun. 9, 2004

(65) Prior Publication Data

US 2005/0014036 A1    Jan. 20, 2005

(30) Foreign Application Priority Data

Jun. 24, 2003    (KR)    ............ 10-2003-0041052

(51) Int. Cl.
*H01M 6/12*    (2006.01)
*H01M 6/46*    (2006.01)
*H01M 2/02*    (2006.01)

(52) U.S. Cl. .................. 429/170; 429/162
(58) Field of Classification Search ............ None
See application file for complete search history.

(56) References Cited

U.S. PATENT DOCUMENTS 6,042,966 A * 3/2000 Cheu ................. 429/163
6,267,790 B1 * 7/2001 Daroux et al. ....... 29/623.2
6,703,162 B2 * 3/2004 Shiota et al. ......... 429/185

FOREIGN PATENT DOCUMENTS

| JP | 2000-353496 | 12/2000 |
|---|---|---|
| JP | 2000-353502 | * 12/2000 |
| JP | 2003-346779 | 12/2003 |
| KR | 2004-13402 | 2/2004 |

OTHER PUBLICATIONS

Office Action issued on Jun. 12, 2007 by the Japanese Patent Office for Japanese Patent Application No. 2004-184640.
Office Action issued on Jun. 28, 2005 in Korean Patent Application No. 2003-41052.

* cited by examiner

*Primary Examiner*—Patrick Ryan
*Assistant Examiner*—Julian Mercado
(74) *Attorney, Agent, or Firm*—Stein, McEwen & Bui, LLP

(57) ABSTRACT

A pouched lithium secondary battery including a battery unit having a positive electrode plate, a negative electrode plate, and a separator disposed between the positive electrode plate and the negative electrode plate; a positive electrode tab electrically connected with the positive electrode plate; a negative electrode tab electrically connected with the negative electrode plate; a case having a space to accommodate the battery unit, and a sealing edge around the space; and a positive electrode voltage applying unit to apply a positive electrode voltage to both the positive electrode tab and the case.

16 Claims, 9 Drawing Sheets

POUCHED LITHIUM SECONDARY BATTERY

CROSS-REFERENCE TO RELATED APPLICATIONS

This application claims the benefit of Korean Patent Application No. 2003-41052, filed on Jun. 24, 2003, in the Korean Intellectual Property Office, the disclosure of which is incorporated herein by reference.

BACKGROUND OF THE INVENTION

1. Field of the Invention

The present invention relates to a lithium secondary battery, and, more particularly, to a pouched lithium secondary battery with an improved structure so that an equal voltage is applied to a case and a positive electrode tab.

2. Description of the Related Art

In general, research into secondary batteries that are rechargeable, unlike primary batteries, has been intensified since the development of portable electronics such as digital cameras, cellular phones, notebook computers, etc. Secondary batteries include nickel-cadmium batteries, nickel-metal hybride batteries, nickel-hydrogen batteries, lithium secondary batteries, etc.

Lithium secondary batteries have a working voltage that is three times greater than nickel-cadmium batteries or nickel-metal hybride batteries, which typically have a working voltage of 3.6V or greater, and are commonly used as a power source of portable electronics. Lithium secondary batteries also have a greater energy density per unit weight. The recent increase in the usage of the lithium secondary batteries in portable electronics is attributed to these advantages.

Lithium secondary batteries may be classified into liquid electrolyte batteries and polymer electrolyte batteries, depending on the type of electrolyte used. In general, lithium secondary batteries which contain liquid electrolytes are called lithium ion batteries, and lithium secondary batteries which contain polymer electrolytes are called lithium polymer electrolytes.

Lithium secondary batteries may be manufactured in various shapes. Lithium ion batteries are typically manufactured in a cylindrical shape or a prismatic shape. Recently more attention has been focused on lithium polymer batteries that may be contained in a flexible pouch. Lithium polymer batteries are safe to operate, and are lightweight, so they are suitable for slim, lightweight portable electronic devices.

Referring to FIG. 1, a conventional pouched lithium secondary battery 10 includes a battery unit 11 and a case 12 that provides a space 12a for accommodating the battery unit 11.

The battery unit 11 is formed by rolling a stack of a positive electrode plate, a separator, and a negative electrode plate in one direction, or by repeatedly stacking a positive electrode plate, a separator, and a negative electrode plate. The positive electrode plate and the negative electrode plate of the battery unit 11 are electrically connected to a positive electrode tab 13 and a negative electrode tab 14, respectively.

An end of each of the positive electrode tab 13 and the negative electrode tab 14 goes through the sealing portion 12b of the case 12, and extends out of the case 12. The externally extended ends of the positive electrode tab 13 and the negative electrode tab 14 are connected to ports of a protective circuit board (not shown), A portion of each of the positive electrode tab 13 and the negative electrode tab 14 located in the sealing portion 12b of the case 12 is wound with a sealing tape 15 to prevent an electrical short circuit.

The case 12 is a pouch comprised of an intermediate metallic foil and internal and external insulating films attached to opposite surfaces of the intermediate metallic foil. This pouched case is very flexible.

The case 12 has the space 12a for accommodating the battery unit 11, as described above. The sealing portion 12b, which may be thermally fused, is formed around the edge of the space 12a.

FIG. 2A is an enlarged, sectional view taken along line I-I in FIG. 1. FIG. 2B is an enlarged, partial view of FIG. 2A.

Referring to FIGS. 2A and 2B, the case 12 is made of a complex film comprised of an intermediate layer 12c that is made of a metallic foil, for example, an aluminum foil, and an internal layer 12d and an external layer 12e, which are protective layers attached to opposite surfaces of the intermediate layer 12c.

The battery unit 11 that includes a roll of the positive electrode plate 11a, the separator 11c, and the negative electrode plate 11b, which are stacked upon one another, is accommodated in the space 12a in the case 12. The positive electrode tab 13 and the negative electrode tab 14 are drawn out from the positive electrode plate 11a and the negative electrode plate 11b, respectively, as shown in FIG. 1. As described above, an end of each of the positive electrode tab 13 and the negative electrode tab 14 is exposed outside the case 12, and a portion of each of the positive electrode tab 13 and the negative electrode tab 14 located in the sealing portion 12b is wound with a sealing tape 15.

In the manufacture of the pouched lithium secondary battery 10 having the structure described above, the positive electrode plate 11a and the negative electrode plate 11b are electrically connected to the positive electrode tab 13 and the negative electrode tab 14, respectively, and a stack of the positive electrode plate 11a, the separator 11c, and the negative electrode plate 11b is rolled to form the battery unit 11.

The battery unit 11 is positioned in the space 12a of the case 12 after an extending process such that an end of each of the positive electrode tab 13 and the negative electrode tab 14 is exposed outside the case 12.

In this state, predetermined amounts of heat and pressure are applied to the sealing portion 12b of the case 12 to complete the manufacture of the pouched lithium secondary battery 10. The pouched lithium secondary battery 10 is subjected to a series of formation processes, including charging, aging, discharging, etc., to structurally stabilize the pouched lithium secondary battery 10 and to determine whether it operates properly.

However, the conventional pouched lithium secondary battery 10 has the following problems.

When a small crack occurs in the internal layer 12d when shaping the case 12, which is a complex film comprised of the insulating internal layer 12d, the metallic intermediate layer 12c, and the insulating external layer 12e, the positive electrode tab 13 and the negative electrode tab 14 may be electrically connected to the intermediate layer 12c when operating the battery 10.

This is especially problematic when the negative electrode tab 14, which is made of a nickel plate, contacts the intermediate layer 12c, which is made of aluminum, due to damage of the internal layer 12d, because the case 12 then has a negative potential. As a result, the intermediate layer 12c, which cannot be protected by the internal layer 12d any longer, corrodes due to a potential difference between the intermediate layer 12c and lithium ions that come from an electrolyte and adhere to the surface of the intermediate layer 12c as the battery is operated.

As the case 12 corrodes more and more, the intermediate layer 12c decomposes, forming a gap in the case 12 and allowing external air to enter through the gap into the case 12.

As moist air enters the case 12, moisture in the air reacts with the battery unit 11, which is charged, particularly with the negative electrode plate 11b of the battery unit 11, and generates gases. The generated gases may swell the case 12 and open a sealed portion 12b of the battery pack of the lithium secondary battery 10.

Therefore, it is necessary to check whether there is an electrical contact between the intermediate layer 12c and the negative electrode tab 14, due to damage of the internal layer 12d, in a formation process after the manufacture of the lithium secondary battery 10.

However, even when the pouched lithium secondary battery 10 is seriously corroded and swollen due to the electrical contact between the intermediate layer 12c and the negative electrode tab 14, the pouched lithium secondary battery 10 may be determined to be in a normally charged state from its voltage level measured in a formation process. In other words, it is not possible to accurately determine whether the pouched lithium secondary battery 10 functions properly or not. Furthermore, the swelling of the lithium secondary battery 10 leads to deformation of the battery pack.

SUMMARY OF THE INVENTION

The present invention provides a pouched lithium secondary battery that has a positive electrode plate electrically connected to a pouched case to induce a short circuit in response to a negative electrode plate of a battery unit contacting the case due to damage of the case while the battery operates. Therefore, variations in an open circuit voltage of the battery are detectable, which allows easier detection of pouched lithium secondary batteries that malfunction.

Additional aspects and/or advantages of the invention will be set forth in part in the description which follows and, in part, will be obvious from the description, or may be learned by practice of the invention.

According to an aspect of the present invention, a pouched lithium secondary battery comprises: a battery unit including a positive electrode plate, a negative electrode plate, and a separator disposed between the positive electrode plate and the negative electrode plate; a positive electrode tab electrically connected with the positive electrode plate; a negative electrode tab electrically connected with the negative electrode plate; a case having a space to accommodate the battery unit, and a sealing edge around the space; and a positive electrode voltage applying unit to apply a positive electrode voltage to the positive electrode tab and the case.

The case may comprise an intermediate layer comprising a metal thin film; and internal and external layers coated on opposite surfaces of the intermediate layer, respectively. The positive electrode voltage applying unit may be formed by exposing a portion of the intermediate layer and electrically connecting the exposed portion of the intermediate layer and the positive electrode tab. Alternatively, the positive electrode voltage applying unit may be formed by removing a portion of the internal layer of the case to expose a portion of the intermediate layer and bringing an external surface of the positive electrode tab into contact with the exposed portion of the intermediate layer. The positive electrode voltage applying unit may be formed by bringing an external surface of the positive electrode tab into contact with an externally exposed edge of the intermediate layer of the case.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
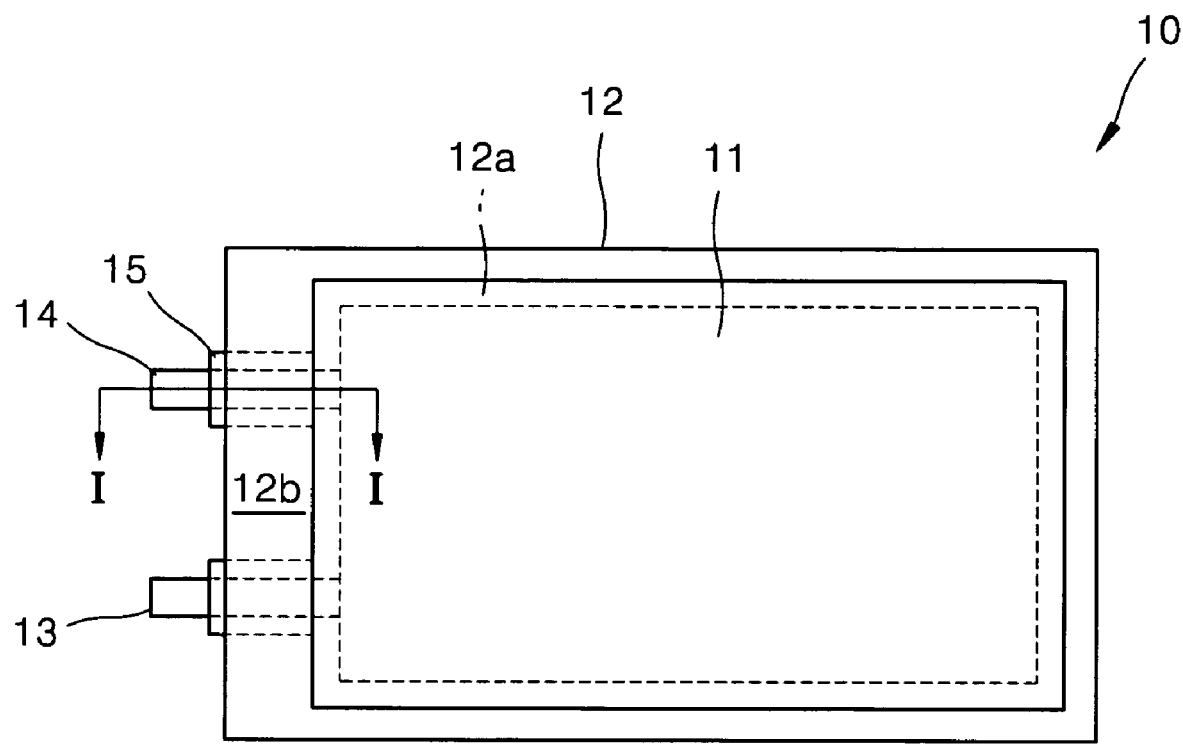
FIG. 1 is a plan view of a conventional secondary battery.
Figure 2A:
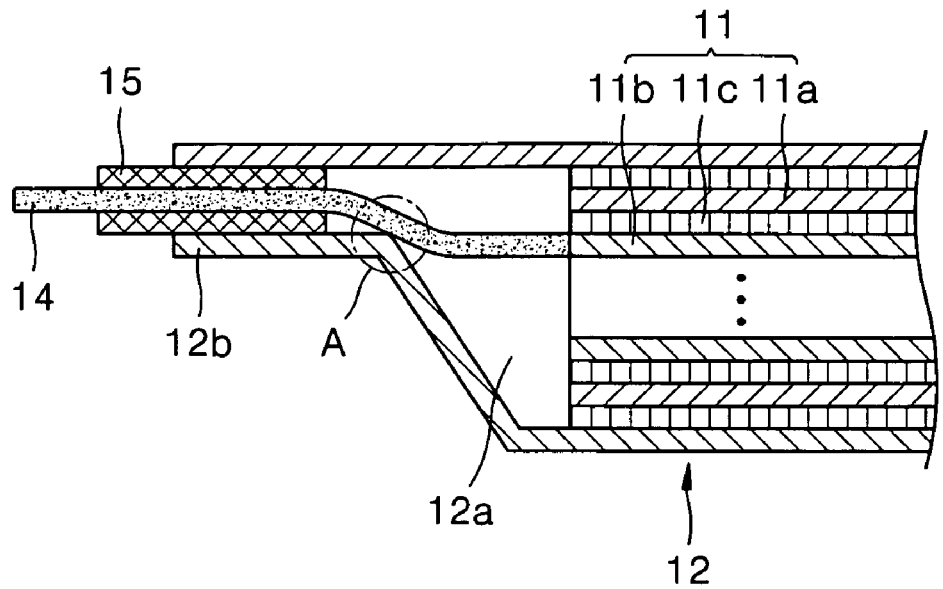
FIG. 2A is a sectional view taken along line I-I in FIG. 1.
Figure 2B:
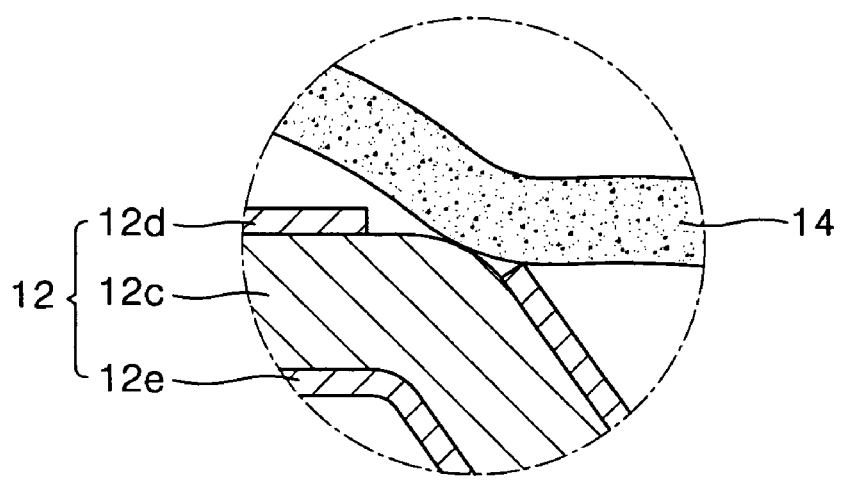
FIG. 2B is an enlarged, partial view of FIG. 2A.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3A:
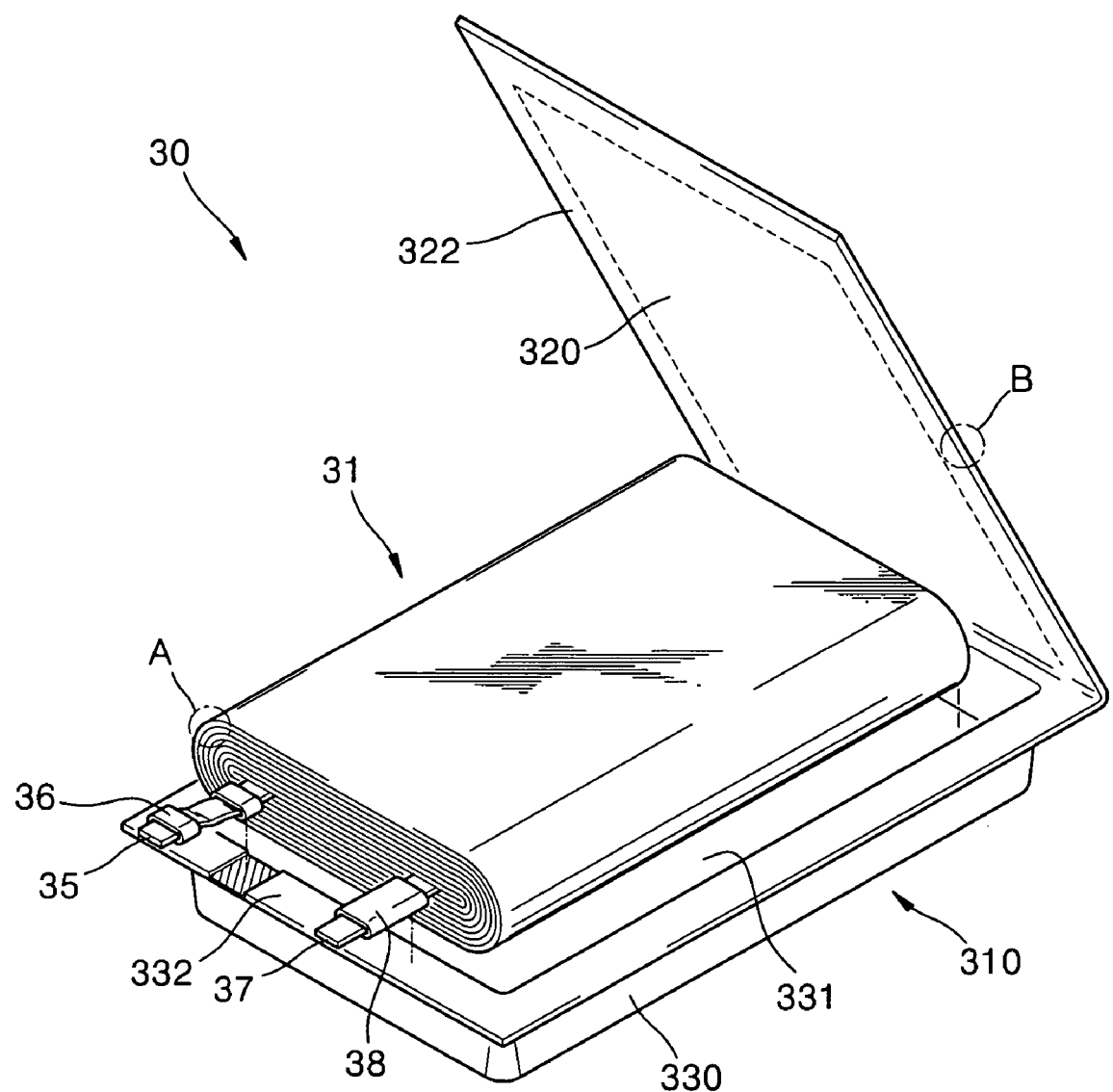
FIG. 3A is an exploded perspective view of a pouched lithium secondary battery according to an embodiment of the present invention.
Figure 3B:
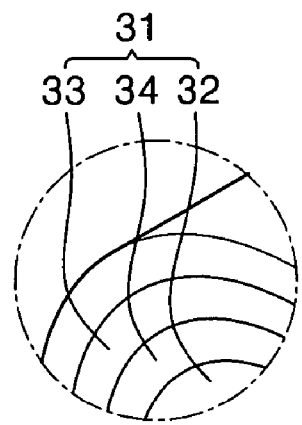
FIG. 3B is an enlarged view of a battery unit in FIG. 3A.
Figure 3C:
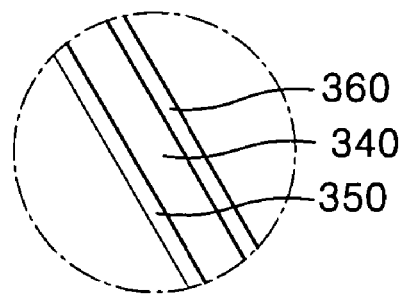
FIG. 3C is an enlarged view of a case in FIG. 3A.

A lithium secondary battery 30 according to an embodiment of the present invention is illustrated in FIG. 3A. FIGS. 3B and 3C are detailed views of a battery unit 31 and a case 310 in FIG. 3A, respectively.

Referring to FIGS. 3A through 3C, the lithium secondary battery 30 includes the battery unit 31 and the case 310 accommodating the battery unit 31. The battery unit 31 includes a positive electrode plate 32, a negative electrode plate 33, and a separator 34 interposed between the positive electrode plate 32 and the negative electrode plate 33 to insulate the electrode plates from one another. The battery unit 31 may have a jelly-roll structure, in which a single stack of the positive electrode plate 32, the separator 34, and the negative electrode plate 33 is rolled, or a stacked structure including multiple stacks of the positive electrode plate 32, the separator 34, and the negative electrode plate 33. This embodiment will be described with reference to a jelly-roll type battery unit.

The positive electrode plate 32 is formed by coating a positive electrode current collector made of a stripy, thin metal plate, for example, an aluminum foil, with a positive electrode active material layer that contains a lithium oxide-based binder, a conducting agent, etc. A positive electrode tab 35 is electrically connected to the positive electrode plate 32. The positive electrode tab 35 may be made of an aluminum plate, and is wound with a positive electrode sealing tape 36.

The negative electrode plate 33 is formed by coating a negative electrode current collector made of a stripy, thin metal plate, for example, a copper foil, with a negative electrode active material layer that contains a carbon-based binder, a conducting agent, etc. A negative electrode tab 37 is electrically connected to the negative electrode plate 33. The negative electrode tab 37 may be made of a nickel plate, and is wound with a negative electrode sealing tape 38.

At least one separator 34 may be interposed between the positive electrode plate 32 and the negative electrode plate 33 for insulation. The separator 34 may be made of a polyethylene film, a polypropylene film, or a compound polyethylene-polypropylene film. The separator 34 may have a larger width than the positive electrode plate 32 and the negative electrode plate 33, in order to prevent a short circuit between the positive electrode plate 32 and the negative electrode plate 33.

The case 310 includes an upper case 320 and a lower case 330 that binds to the upper case 320 to form a sealed space. At least one edge of each of the upper case 320 and the lower case 330 may be inherently connected together. The case 310 may have a hexahedral shape when the upper case 320 and the lower case 330 are bound together.

The lower case 330 has a space 331 to accommodate the battery unit 31, and a lower sealing edge 332 around the space 331. The upper case 320 has an upper sealing edge 322 that corresponds to the lower sealing edge 332. The upper sealing edge 322 and the lower sealing edge 332 may be thermally fused to seal the case 310 after the battery unit 31 has been placed in the space 331.

The upper case 320 and the lower case 330 may be made of substantially the same material. The case 310 may include an intermediate layer 340 made of a flexible metal, such as an aluminum foil, an internal layer 350 formed as a protective layer by coating a polymer on an internal surface of the intermediate layer 340 to prevent reaction with an electrolyte, and an external layer 360 formed as a protective layer by coating a polymer on an external surface of the intermediate layer 340 to prevent the intermediate layer 340 from being exposed to air.

A feature of the pouched lithium secondary battery 30 according to an embodiment of the present invention lies in that a positive potential is applied to both the positive electrode tab 35, which is electrically connected with the positive electrode plate 32, and the intermediate layer 340 of the case 310 by means of a positive voltage applying unit.

Figure 4A:
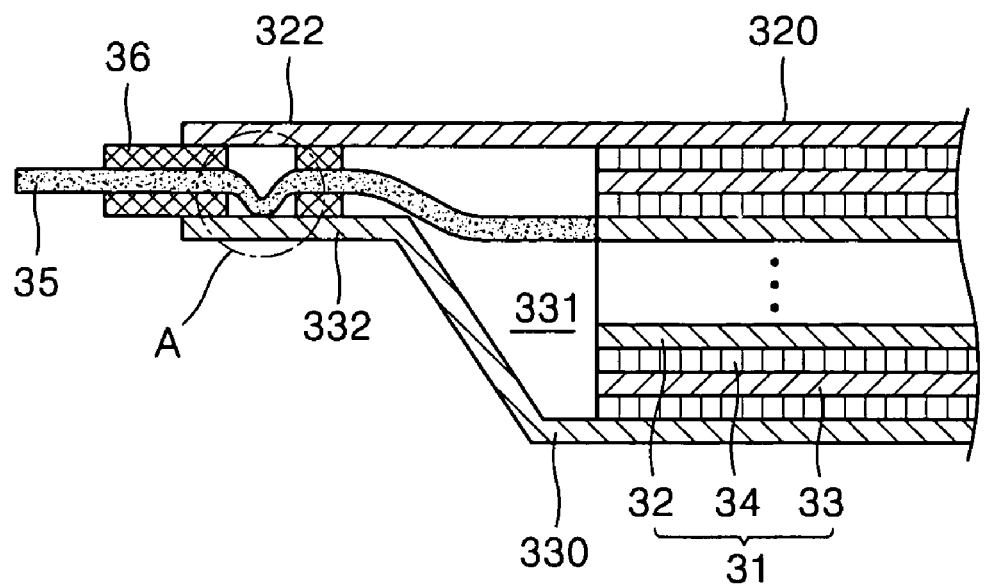
FIG. 4A is an enlarged, partial sectional view of an area in FIG. 3A where a positive electrode tab is formed.
Figure 4B:
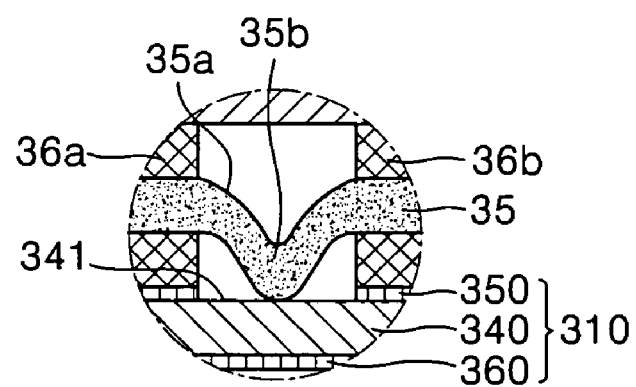
FIG. 4B is an enlarged, partial sectional view of FIG. 4A.

FIG. 4A is a partial sectional view of the pouched lithium secondary battery in FIG. 3, and FIG. 4B is an enlarged, partial sectional view of FIG. 4A.

Referring to FIGS. 4A and 4B, the battery unit 31, which is formed by rolling a stack of the positive electrode plate 32, the separator 34, and the negative electrode plate 33, is accommodated in the case 310. The positive electrode tab 35 connected to the positive electrode plate 32, and the negative electrode tab 37 (see FIG. 3A) connected to the negative electrode plate 33, are positioned between the upper sealing edge 322 of the upper case 320 and the lower sealing edge 332 of the lower case 330, which surround the space 331 accommodating the battery unit 31.

An end of each of the positive electrode tab 35 and the negative electrode tab 37 extends out of the upper case 320 and the lower case 330 that have been thermally fused by applying heat and pressure. A portion of each of the positive electrode tab 35 and the negative electrode tab 37 which contacts the upper sealing edge 322 and the lower sealing edge 322 is wound with a sealing tape. The portion of the positive electrode tab 35 is wound with a positive electrode sealing tape 36, and the portion of the negative electrode tab 37 is wound with a negative electrode sealing tape 38.

The positive electrode tab 35 is electrically connected to the case 310 by a positive electrode voltage applying unit. In particular, an unwound portion 35a of the positive electrode tab 35 that lies between the upper sealing edge 322 and the lower sealing edge 332 is not wound with the positive electrode sealing tape 36, and directly contacts the lower sealing edge 332. Portions of the positive electrode tab 35 that are on the sides of the unwound portion 35a are wound with first and second positive electrode sealing tape portions 36a and 36b, respectively. Alternatively, when the positive electrode tab 35 is wound with the sealing tape 36, a side portion of the positive electrode tab 35 that lies between the upper and lower sealing edges 322 and 332 may remain unwound.

A portion of the case 310 that corresponds to the unwound portion 35a of the positive electrode tab 35 has no internal layer 350, so that an exposed portion 341 of the intermediate layer 340 made of a metallic thin film, for example, an aluminum foil, is electrically connected with the unwound portion 35a of the positive electrode tab 35.

In order to better accommodate the contact between the unwound portion 35a of the positive electrode tab 35 and the exposed portion 341 of the intermediate layer 340, the unwound portion 35a of the positive electrode tab 35 may be bent downward, forming a notch portion 35b. The apex of the notch portion 35b contacts the exposed portion 341 of the intermediate layer 340.

Since the notch portion 35b of the positive electrode tab 35 is electrically connected with the exposed portion 341 of the intermediate layer 340 of the case 310, the same positive electrode potential can applied to the positive electrode tab 35 and the intermediate layer 340 when the battery operates. Unlike the positive electrode tab 35, the portion of the negative electrode tab 37 that lies between the upper and lower sealing edges 322 and 332 is fully wound with the negative electrode sealing tape 38.

As described above, in the pouched lithium secondary battery 30 according to an embodiment of the present invention, the case 310 is electrically connected with the positive electrode tab 35, and has a positive electrode voltage, but is insulated from the negative electrode tab 37.

The notch portion 35b may be formed by bending the unwound portion 35a of the positive electrode tab 35 which results from winding the above-described portions on the sides of the unwound portion 35a with the first and second positive electrode sealing tape portions 36a and 36b. The exposed portion 341 of the intermediate layer 340 may be formed by scratching or by controlling the temperature in a thermal fusing process.

Figure 5:
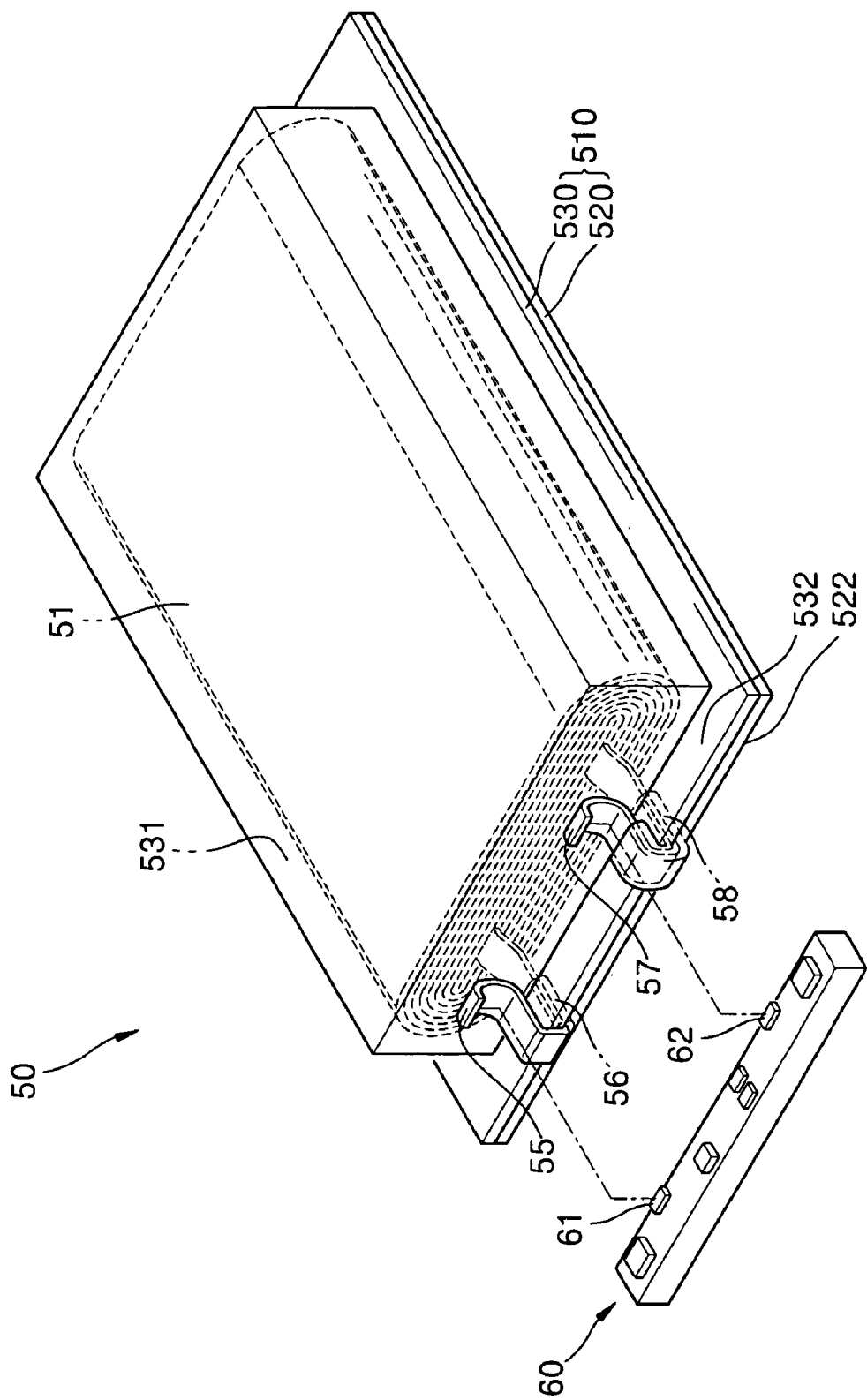
FIG. 5 is an exploded perspective view of a pouched lithium secondary battery according to anther embodiment of the present invention.
Figure 6A:
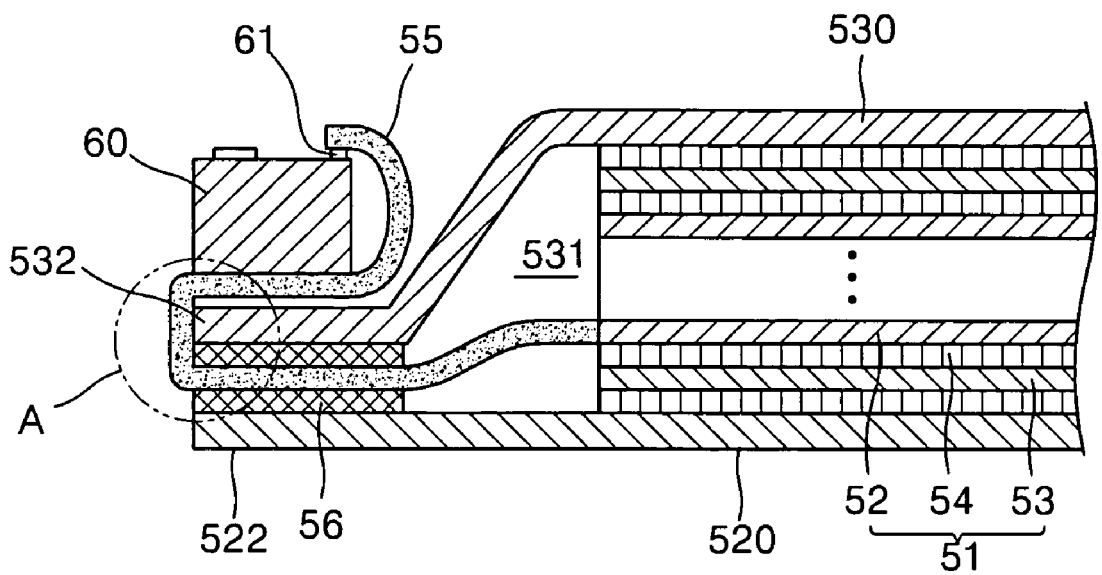
FIG. 6A is an enlarged, partial sectional view of an area in FIG. 5 where a positive electrode tab is formed.
Figure 6B:
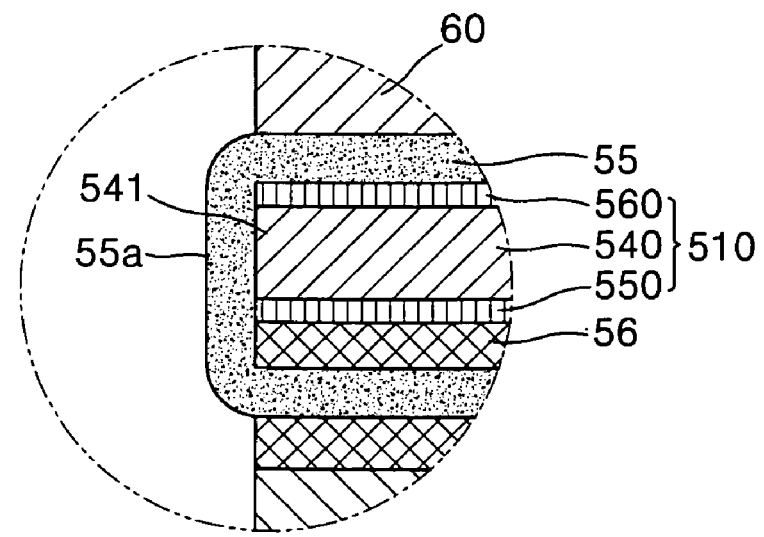
FIG. 6B is an enlarged, partial sectional view of FIG. 6A.

FIG. 5 illustrates a lithium secondary battery 50 according to another embodiment of the present invention. FIG. 6A is a partial sectional view of FIG. 5 illustrating a positive electrode tab 55 in the pouched lithium secondary battery 50. FIG. 6B is an enlarged partial view of FIG. 6A.

Referring to FIG. 5, the lithium secondary battery 50 includes a battery unit 51 and a case 510 accommodating the battery unit 51. The battery unit 51 includes a positive electrode plate 52, a separator 54, and a negative electrode plate 53, in a jelly-roll or stacked structure. The positive electrode tab 55 extends from the positive electrode plate 52 and is wound with a positive electrode sealing tape 56. A negative electrode tab 57 extends from the negative electrode plate 53 and is wound with a negative electrode sealing tape 58. The positive electrode tab 55 may be made of an aluminum plate. The negative electrode tab 57 may be made of a nickel plate.

The case 510 includes an upper case 520, and a lower case 530 that binds to the upper case 520. The upper case 520 and the lower case 530 may form a hexahedron when bound together, with at least one hinged common edge. The lower case 530 has a space 531 to accommodate the battery unit 51, and a lower sealing edge 532 around the space 531. The upper case 520 has an upper sealing edge 522 that corresponds to the lower sealing edge 532. As shown in FIG. 6B, the case 510 may include an intermediate layer 540 made of a flexible metal, such as an aluminum foil, an internal layer 550 formed by coating a polymer on an internal surface of the intermediate layer 540, and an external layer 560 formed by coating a polymer on an external surface of the intermediate layer 540.

An end of each of the positive electrode tab 55 and the negative electrode tab 57, which extends out of the case 510, is electrically connected to a positive electrode lead 61 and a negative electrode lead 62, respectively, in a protective circuit board 60 that is installed to cut off a flow of current when the battery is overcharged.

Since the positive electrode tab 55 of the pouched lithium secondary battery 50 is connected to the protective circuit board 60, a positive electrode voltage can be applied to the case 510 by an external positive electrode voltage applying unit.

Referring to FIGS. 6A and 6B, the battery unit 51, which is formed by rolling a stack of the positive electrode plate 52, the separator 54, and the negative electrode plate 53, is accommodated in the case 510. An end of the positive electrode tab 55 extends out of the case 510 between the upper sealing edge 522 of the upper case 520 and the lower sealing edge 532 formed around the space 531 of the lower case 530 accommodating the battery unit 51.

The end of the positive electrode tab 55, which extends out between the sealed upper and lower cases 520 and 530, is wound with the positive electrode sealing tape 56. The extended end of the positive electrode tab 55 is folded back at least one time toward the case 510, and is electrically connected to the positive electrode lead 61 in the protective circuit board 60.

A folded unwound portion 55a of the positive electrode tab 55, which extends a predetermined length out of the upper and lower sealing edges 522 and 532, is not wound with the positive electrode sealing tape 56. An edge 541 of the intermediate layer 540 of the case 510, which is aligned with the upper and lower sealing edges 522 and 532, is exposed as a result of cutting performed to form the case 510.

The unwound portion 55a of the positive electrode tab 55, which is folded to connect with the protective circuit board 60, is electrically connected with the edge 541 of the intermediate layer 540. For a more stable electrical connection between the positive electrode tab 55 and the case 510, a portion of the external layer 560 of the case 510 above the lower sealing edge 532 may be partially removed so that the unwound portion 55a of the positive electrode tab 55 is electrically connected with the intermediate layer 540 of the case 510 exposed through the removed portion of the external layer 560.

As described above, since the unwound portion 55a of the positive electrode tab 55 extending out of the case 510 is electrically connected with the edge 541 of the intermediate layer 540, or another portion of the intermediate layer 540 that is exposed through the removed portion of the external layer 560, the same positive electrode potential can be applied to the positive electrode tab 55 and the case 510 when the battery operates.

Figure 7A:
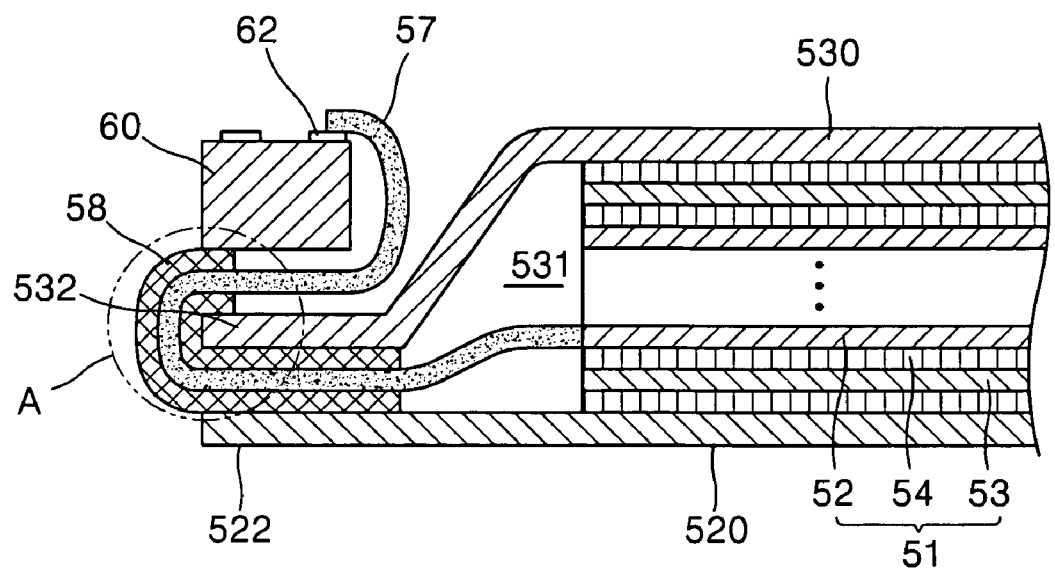
FIG. 7A is an enlarged, partial sectional view of an area in FIG. 5 where a negative electrode tab is formed.
Figure 7B:
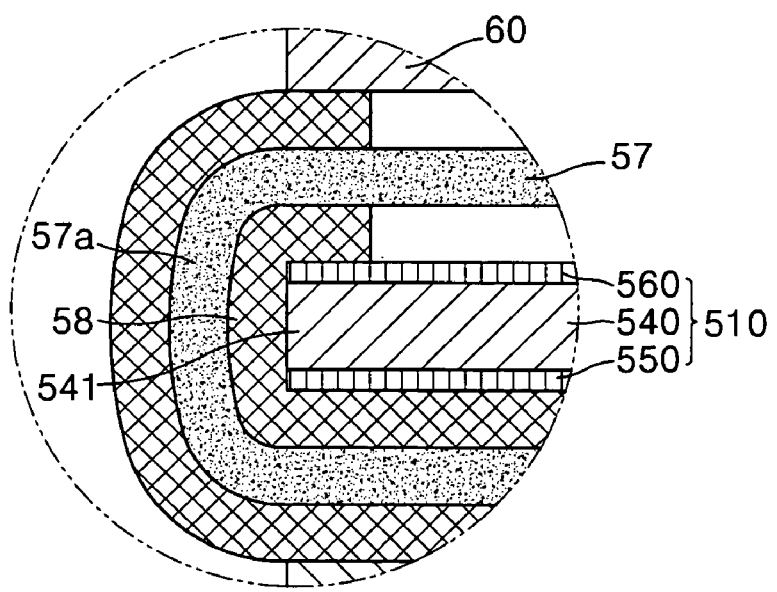
FIG. 7B is an enlarged, partial sectional view of FIG. 7A.

Unlike the positive electrode tab 55, the negative electrode tab 57 is insulated from the case 510, as illustrated in FIGS. 7A and 7B. In particular, the negative electrode tab 57 extends out of the case 510 between the sealed upper and lower sealing edges 522 and 532 around the space 531 accommodating the battery unit 51. An end of the negative electrode tab 57 extends out of the sealed upper and lower cases 520 and 530 and is wound with a negative electrode sealing tape 58. Like the positive electrode tab 55, the extending end of the negative electrode tab 57, which is wound with the negative electrode sealing tape 58, is folded back at least one time toward the case 510, and is electrically connected to the negative electrode lead 62 in the protective circuit board 60.

However, unlike the positive electrode tab 55, a folded portion 57a of the negative electrode tab 57, which corresponds to the edge 541 of the intermediate layer 540, is fully wound with the negative electrode sealing tape 58 to be insulated from the case 510. The negative electrode tab 57 is not electrically connected with the edge 541 of the intermediate layer 540 of the case 50, even when folded for connection with the protective circuit board 60.

As described above, in the pouched lithium secondary battery 50 in FIG. 5 according to this embodiment of the present invention, the case 510 is electrically connected with the positive electrode tab 55, and has a positive electrode voltage, but is insulated from the negative electrode tab 57.

Figure 8:
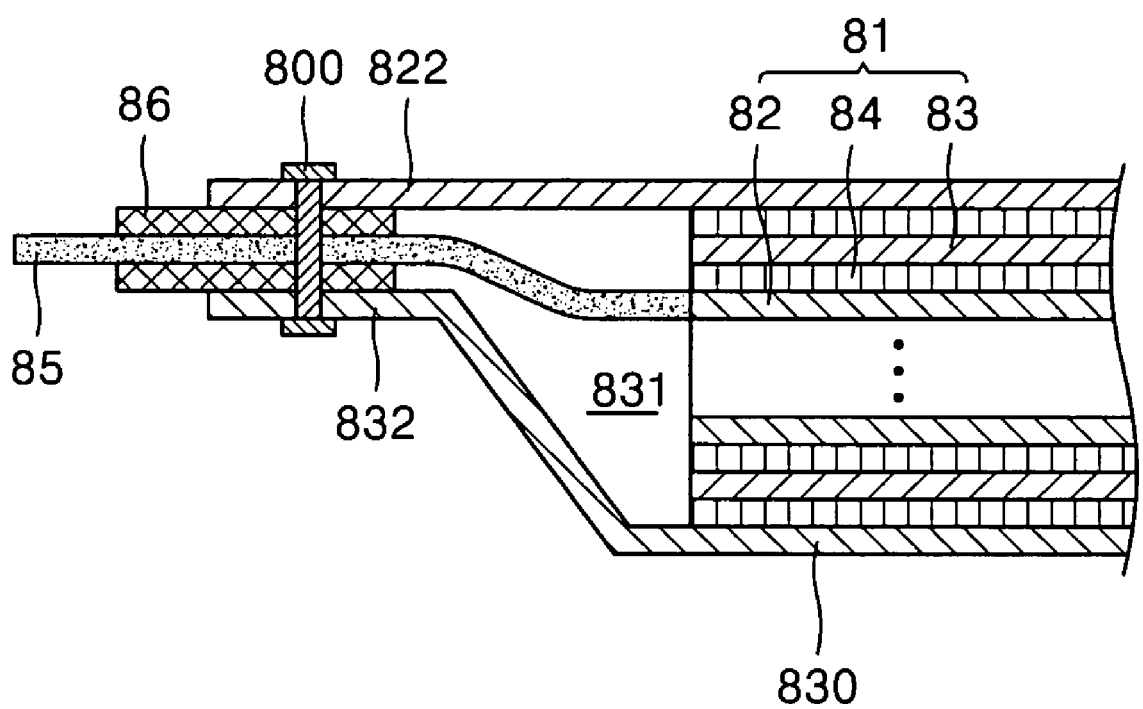
FIG. 8 is an exploded perspective view of a pouched secondary lithium battery according to yet another embodiment of the present invention.

FIG. 8 is a partial sectional view of a pouched lithium secondary battery according to yet another embodiment of the present invention. Referring to FIG. 8, a battery unit 81, which is formed by rolling a stack of a positive electrode plate 82, a separator 84, and a negative electrode plate 83, is accommodated in a case 830. A positive electrode tab 85, connected to the positive electrode plate 82, extends out of the case 830 through sealed upper and lower sealing edges 822 and 832, formed around a space 831 in the case 830 accommodating the battery unit 81. A portion of the positive electrode tab 85 that lies between the upper and lower sealing edges 822 and 832 is wound with a positive electrode sealing tape 86, to provide a tighter seal when the upper and lower sealing edges 822 and 832 are thermally fused.

The positive electrode tab 85 is electrically connected with the case 830 by a positive electrode voltage applying unit. The positive electrode voltage applying unit includes a conductive pin 800 that passes through the case 830 and the positive electrode tab 85. An intermediate layer of the case 830, which is made of an aluminum foil, is electrically connected with the positive electrode tab 85 by the conductive pin 800. As a result, a positive electrode voltage can be applied to both the case 830 and the positive electrode tab 85 when the battery operates. Although not illustrated, a negative electrode tab is insulated from the case 830.

A voltage measurement and a corrosion test, which are usually carried out in a formation process, were performed on pouched lithium secondary batteries having the above-described structures in the following examples. The results are as follows.

EXAMPLES 1 THROUGH 3

The pouched lithium secondary battery 30 illustrated in FIGS. 3A through 4B was manufactured. The jelly-roll type battery unit 31 was manufactured by rolling a stack of the positive electrode plate 32, the separator 34, and the negative electrode plate 33, and then placed in the space 331 of the case 310. An end of each of the positive electrode tab 35 and the negative electrode tab 37 connected to the battery unit 31 was extended out of the case 310 through the upper and lower sealing edges 322 and 332.

The positive electrode tab 35, which extends through the upper and lower sealing edges 322 and 332, was partially wound with the positive electrode insulating tape 36 so that the portion 35a is exposed unwound. A portion of the negative electrode tab 37 between the upper and lower sealing edges 322 and 332 was fully wound with the negative electrode insulating tape 38.

The notch portion 35b was formed in the unwound portion 35a of the positive electrode tab 35. A portion of the internal layer 350 of the case 310, which corresponded to the notch portion 35b, was removed to allow the notch portion 35b to contact the intermediate layer 340 underlying the removed portion of the internal layer 350, so that the positive electrode tab 35 was electrically connected with the case 310.

The upper and lower sealing edges 322 and 332 of the case 310 were thermally fused under pressure to provide the pouched lithium secondary battery 30.

COMPARATIVE EXAMPLES 1 THROUGH 3

A pouched lithium secondary battery was manufactured in the same manner as in Example 1, except that both the positive electrode tab and the negative electrode tab that extend out of the case were fully wound with the positive electrode insulating tape and the negative electrode insulating tape, respectively, the notch portion was not formed, and the internal layer of the case was not removed, so that both the positive electrode tab and the negative electrode tab were insulated from the case.

The open circuit voltage (OCV) with respect to time and the degree of corrosion were measured using the pouched secondary batteries manufactured in Examples 1 through 3 and Comparative Examples 1 through 3. In addition, whether or not swelling had occurred was observed. If corrosion or swelling occurs in a pouched secondary battery, a short circuit between the negative electrode tab and the case is highly likely to occur due to generation of microcracks in the case.

The results are shown in Table 1.

As is apparent from the above, there is no great change in the open circuit voltages of the pouched lithium secondary batteries of Examples 1 through 3 after 1 day from being manufactured. However, after 5 days corrosion had occurred, and the open circuit voltage dropped in the lithium secondary battery of Example 3 from about 4.2V to about 1.82V. This is attributed to the damage of the internal layer of the case by corrosion. The damage of the internal layer allows the negative electrode tab, which has an opposite polarity to the positive electrode tab, to contact the intermediate layer of the case to which a positive electrode voltage has been applied, and thus causes a short circuit.

It is believed that no swelling in the pouched lithium secondary batteries produced according to embodiments of the present invention is attributed to the discharging of the batteries lead by a short circuit. As the lithium secondary batteries are discharged due to occurrence of a short circuit, lithium ions migrate to the positive electrode plate and there is no reactant in the negative electrode plate, so that no gas is generated even when the lithium secondary batteries are exposed to moisture.

As described above, potential corrosion caused by the damage of the internal layer of the case in the pouched lithium secondary batteries of Examples 1 through 3, according to embodiments of the present invention, can be measured from variation in open circuit voltages. Furthermore, no swelling occurs in the pouched lithium secondary batteries according to embodiments of the present invention even when their case corrodes.

TABLE 1

| Example | Immediately after manufacturing | | After 1 day | | After 5 days | |
|---|---|---|---|---|---|---|
| | OCV (V) | Appearance | OCV (V) | Appearance | OCV (V) | Appearance |
| Example 1 | 4.1840 | No change | 4.1838 | No change | 4.1835 | No corrosion, no swelling |
| Example 2 | 4.1844 | No change | 4.1819 | No change | 1.8200 | Corrosion, no swelling |
| Example 3 | 4.1841 | No change | 4.0169 | Corrosion | 0.8560 | Corrosion, no swelling |
| Comparative Example 1 | 4.1846 | No change | 4.1837 | Corrosion | 4.1832 | Corrosion, swelling |
| Comparative Example 2 | 4.1847 | No change | 4.1847 | No change | 4.1841 | Corrosion, swelling |
| Comparative Example 3 | 4.1823 | No change | 4.1822 | Corrosion | 4.1817 | Corrosion, swelling |

As shown in Table 1, immediately after being manufactured, the pouched lithium secondary batteries of Examples 1 through 3 according to embodiments of the present invention had an open circuit voltage of 4.1840V, 4.1844V, and 4.1841V, respectively, and there was no change in their appearance. After 1 day from the manufacture, the pouched lithium secondary batteries of Examples 1 through 3 had an open circuit voltage of 4.1838V, 4.1819V, and 4.0169V, respectively, and partial corrosion occurred only in the battery of Example 3. After 5 days from the manufacture, the pouched lithium secondary batteries of Examples 1 through 3 had an open circuit voltage of 4.1835V, 1.8200V, and 0.8560V, respectively, and no swelling occurred in any of the three batteries. However, partial corrosion occurred in the lithium secondary batteries manufactured in Examples 2 and 3.

Meanwhile, as shown in Table 1, the pouched lithium secondary batteries manufactured in Comparative Examples 1 through 3 have an open circuit voltage of 4.1846V, 4.1847V, and 4.1823V, respectively, and there was no change in their appearance. The open circuit voltages of the lithium secondary batteries of Comparative Examples 1 through 3 remained relatively steady at 4.1837V, 4.1846V, and 4.1822V, respectively, after 1 day from the manufacture. In addition, two of the three lithium secondary batteries corroded. The open circuit voltages of the lithium secondary batteries of Comparative Examples 1 through 3 were still relatively steady at 4.1832V, 4.1841V, and 4.1817V, respectively, even after 5 days from the manufacture. Furthermore, all of the lithium secondary batteries of Comparative Examples 1 through 3 have corroded and swelled.

As described above, in the conventional pouched lithium secondary batteries, there is no change in open circuit voltage even after up to 5 days from the manufacture. However, as the conventional batteries are used, moisture permeates the lithium secondary batteries in a charged state and generates gas by reaction with the positive electrode plate, thereby swelling the conventional batteries. In other words, the conventional pouched lithium secondary batteries have a problem in that their open circuit voltage is almost constant even when they have swelled, indicating that it is impossible to accurately determine whether the operation of the conventional batteries is normal.

A pouched lithium secondary battery according to embodiments of the present invention as described above provides the following effects.

First, since a positive electrode voltage is applied to both the metallic intermediate layer of the case and the positive electrode tab of the battery, a short circuit is easily induced when the negative electrode tab contacts the metallic intermediate layer of the case due to damage of the internal layer of the case, thereby enabling detecting variation in open circuit voltage and screening out secondary batteries that malfunction.

Second, even when the pouched case of the lithium secondary battery corrodes, no reaction occurs in the negative electrode plate of the lithium secondary battery being discharged due to the short circuit, so that swelling can be prevented, ensuring the safety of the lithium secondary battery. In addition, a fused sealing portion of a battery pack accommodating the lithium secondary battery does not break up due to swelling, but remains sealed.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A pouched lithium secondary battery comprising:
   a battery unit comprising:
      a positive electrode plate,
      a negative electrode plate, and
      a separator disposed between the positive electrode plate and the negative electrode plate;
   a positive electrode tab electrically connected with the positive electrode plate, comprising an exposed portion, and insulating tapes flanking the exposed portion;
   a negative electrode tab electrically connected with the negative electrode plate, comprising sealing tape wound thereon, to insulate the negative electrode tab from the intermediate layer of the case;
   a case comprising an intermediate layer comprising a metal thin film, and internal and external layers coated on opposite surfaces of the intermediate layer, respectively, and having a space to accommodate the battery unit, and a sealing edge around the space; and
   a positive electrode voltage applying unit to apply a positive electrode voltage to both the positive electrode tab and the case, wherein
   the positive electrode voltage applying unit comprises the exposed portion of the positive electrode tab, which is electrically connected to an exposed portion of the intermediate layer.

2. The pouched lithium secondary battery of claim 1, wherein the exposed portion of the intermediate layer is formed by scratching or by controlling a temperature in a thermal fusing process.

3. The pouched lithium secondary battery of claim 1, wherein the positive electrode voltage applying unit is formed by removing a portion of the internal layer of the case to expose a portion of the intermediate layer and bringing an external surface of the positive electrode tab into contact with the exposed portion of the intermediate layer.

4. The pouched lithium secondary battery of claim 1, wherein the intermediate layer of the case comprises an aluminum foil.

5. The pouched lithium secondary battery of claim 1, wherein the positive electrode tab comprises an aluminum plate.

6. The pouched lithium secondary battery of claim 1, wherein the negative electrode tab comprises a nickel plate.

7. The pouched lithium secondary battery of claim 1, wherein the positive electrode plate is formed by coating a positive electrode active material layer on at least one surface of a positive electrode current collector.

8. The pouched lithium secondary battery of claim 1, wherein the negative electrode plate is formed by coating a negative electrode active material layer on at least one surface of a negative electrode current collector.

9. The pouched lithium secondary battery of claim 1, wherein the separator comprises a polyethylene film, a polypropylene film, or a compound polyethylene-polypropylene film.

10. The pouched lithium secondary battery of claim 1, wherein the case comprises an upper case part coupled to a lower case part.

11. The pouched lithium secondary battery of claim 10, wherein the coupled upper case part and lower case part form a hexahedral shape.

12. A pouched lithium secondary battery comprising:
   a battery unit comprising:
      a positive electrode plate,
      a negative electrode plate, and
      a separator disposed between the positive electrode plate and the negative electrode plate;
   a positive electrode tab electrically connected with the positive electrode plate;
   a negative electrode tab electrically connected with the negative electrode plate;
   a case having a space to accommodate the battery unit, and a sealing edge around the space; and
   a positive electrode voltage applying unit to apply a positive electrode voltage to both the positive electrode tab and the case,
   wherein the case comprises:
      an intermediate layer comprising a metal thin film, and internal and external layers coated on opposite surfaces of the intermediate layer, respectively, and
   wherein the positive electrode voltage applying unit is formed by partially winding portions of the positive electrode tab extending from the positive electrode plate, the portion of the positive electrode tab being disposed in the sealing edge of the case, with a positive electrode sealing tape such that an unwound portion is formed between two wound portions of the positive electrode tab, removing a portion of the internal layer of the case which corresponds to the unwound portion of the positive electrode tab to expose a portion of the intermediate layer, and electrically connecting the unwound portion of the positive electrode tab to the exposed portion of the intermediate layer.

13. The pouched lithium secondary battery of claim 12, wherein the unwound portion of the positive electrode tab has a notch portion to form a stable electrical connection with the exposed portion of the intermediate layer.

14. A pouched lithium secondary battery comprising:
a battery unit;
a case to accommodate the battery unit, having a sealing edge to seal the battery unit in the case;
a positive electrode tab extending from the battery unit; and
sealing tapes disposed on the positive electrode sealing tab;
wherein an exposed portion of the positive electrode tab between the sealing tapes is disposed inside the sealing edge of the case, and is electrically connected to the case.

15. The pouched lithium secondary battery of claim 14, wherein the case comprises:
an electrically conductive intermediate layer; and
internal and external layers respectively disposed on opposite surfaces of the intermediate layer.

16. The pouched lithium secondary battery of claim 15, wherein the portion of the positive electrode tab is electrically connected to a portion of the intermediate layer which is not covered by the internal layer.

* * * * *